United States Patent [19]

Tso et al.

[11] 3,845,774

[45] Nov. 5, 1974

[54] PROCESS FOR CURING TOBACCO

[76] Inventors: Tien C. Tso, 4306 Yates Rd., Beltsville, Md. 20705; Richie H. Lowe, Rt. 4, Box 277, Nicholasville, Ky. 40356; Donald W. Dejong, 1901 Hillock Dr., Raleigh, N.C. 27612

[22] Filed: Jan. 31, 1973

[21] Appl. No.: 328,204

Related U.S. Application Data

[63] Continuation-in-part of Ser. No. 166,963, July 28, 1971, abandoned.

[52] U.S. Cl. .............................. 131/140 C, 131/141
[51] Int. Cl. ............................................ A24b 15/00
[58] Field of Search..... 131/140 C, 140 P, 140–144, 131/17

[56] References Cited
UNITED STATES PATENTS

| | | | |
|---|---|---|---|
| 3,020,179 | 2/1962 | Hess | 131/17 |
| 3,132,651 | 5/1964 | Kiefer | 131/141 |
| 3,223,090 | 12/1965 | Strubel et al. | 131/140 P |
| 3,240,214 | 3/1966 | Bavley et al. | 131/141 |
| 3,599,645 | 8/1971 | Johnson | 131/140 |

OTHER PUBLICATIONS

Leaf Tobacco Composition: The Potentional For Genetic Changes Article in "Tobacco" by Dr. T. C. Tso, Vol. 168, No. 17 April 25, 1969 pages 69–73.
The Action of Commercial Cellulase Preparations on Alkaloids in Tobacco Article in "Tobacco Science" by Dr. Henri Silberman, Vol. 162 No. 12 pages 30–32 inc.
Dangerous Properties of Industrial Materials by N. Irving Sax (Text) 1969 pub. by Reinhold Book Corp. N.Y. (Third Edition) page 1126 cited.

*Primary Examiner*—Melvin D. Rein
*Attorney, Agent, or Firm*—M. Howard Silverstein; Max D. Hensley; William E. Scott

[57] ABSTRACT

A method is provided for curing tobacco by homogenizing harvested leaves. The leaves may be pretreated in the field to achieve uniform yellowing or they can be yellowed by postharvest conditioning. The leaves are cut into 5/64 inch or smaller size pieces and homogenized in a blending or grinding type machine. The homogenized leaf material is then incubated after which the conditioned leaf material is cured. An important feature of this invention is that the composition of the cured tobacco can be altered and undesirable components reduced or eliminated by regulating the metabolic processes during curing through physical, chemical or biological means.

7 Claims, No Drawings

PROCESS FOR CURING TOBACCO

This application is a continuation-in-part of our copending application for patent, Ser. No. 166,963, filed July 28, 1971, now abandoned.

A non-exclusive, irrevocable, royalty-free license in the invention herein described, throughout the world for all purposes of the United States Government, with the power to grant sublicenses for such purposes, is hereby granted to the Government of the United States of America.

This invention relates to a method and procedures for curing harvested tobacco leaf. More particularly, it relates to the homogenization of harvested leaf materials and curing the same under special conditions to achieve desired quality and at the same time save the labor in handling.

In usual practice of tobacco production, when tobacco leaves reach maturity, either the whole plant is harvested by stalk-cutting after which it is air-cured, or each single leaf is primed and flue-cured or air-cured, depending on the tobacco type. In tobacco technology, "curing" usually refers to changes that harvested fresh leaves undergo when subjected to regulated conditions of temperature and humidity. It is a vital process and falls into the category of starvation phenomena or inanition of excised plant parts. The purpose of curing is to transform the harvested green material to a form having the physical and chemical characteristics desired for smoking. It is not merely a dehydration process, but involves complicated physical, chemical and biochemical processes.

Conventional curing methods are time consuming and offer little opportunity for manipulation of the leaf characteristics. Harvest and post-harvest handling may amount to 50-55 percent of total production time. A number of new curing methods have been proposed but none of them attempt to alter leaf composition with a view towards improving tobacco quality or reducing health-hazard factors. An attempt to develop a new method by cutting the tobacco leaves into narrow strips before curing was found to be unsatisfactory. Reconstituted tobacco sheet, that is, a sheet made from finely ground conventionally cured tobacco leaves, when compared with natural tobacco and standard tobacco blends, produced lower yields of condensate and the condensate exhibited lower tumorigenic activity (Tobacco and Tobacco Smoke, Studies in Experimental Carcinogenesis, Ernest L. Wyndler and Dietrich Hoffman, Academic Press, New York and London, 1967, page 79, Tables IV.3 and IV.4 and pages 531 and 532 and FIG. IX.13 (page 531)). In view of these facts, it is no longer considered essential to preserve the tobacco leaf in its natural form during curing and processing.

An object of the present invention is to reduce curing and other post-harvest expenses.

Another object is to reduce or eliminate in the tobacco factors that may be associated with health problems.

A further object is to enhance the desirable properties of tobacco and thus make it more usable.

In general, according to this invention, harvested tobacco i.e., uncured tobacco, is cured not as the whole leaf but as a homogenized mass. In addition to being an innovative way of curing tobacco, the invention is important because the metabolic processes can be regulated to alter the final composition of the cured tobacco. In addition, undesirable components can be reduced in amount or completely eliminated by physical, chemical or biological means or combinations of such means. Also, the cured material can be easily stored for aging or other processing such as fermentation prior to being reconstituted for manufacture into a smoking product.

In the practice of this invention, tobacco leaves are removed from stalks in the field. The tobacco plants may be pretreated in the field with any of the known ethylene-releasing agents to achieve uniform yellowing, or they can be primed, that is, the leaves can be harvested as they ripen. Leaves from certain varieties may be homogenized immediately, while others may need a period of pile conditioning to yellow them before homogenization. The homogenization is carried out in a Waring blender or meat grinder, or similar machine, which cuts the leaf material into five sixty-fourths inch size or less. Depending on type of tobacco, some liquid may be added during the homogenization, chemicals or enzymes may be added, and the pH of the medium may be adjusted. At this stage the mass is ready for incubation; conditioning and length of time again vary by tobacco type. It is during the homogenizing and incubating steps that chemical, physical, and biological means can be used to manipulate and regulate the composition of the final product. After incubation, the mass is then either spread into a sheet form or placed into a container for curing under various temperature and moisture conditions as it is dried.

The following examples are illustrative of the invention. It will be readily apparent from the multiple variables that suitable conditions may be found to meet any special requirements desired by the tobacco industry or the consumer.

Example 1

Burley tobacco (Burley 21) harvested from a greenhouse was ground in a blender (400 gms. with 200 ml water). The homogenized mass was allowed to incubate in a beaker at room temperature (72°–75°F) for 24 hours and spread onto a support in sheet form at a thickness of 0.5 mm. It was then dried for 16 hours at 72°–75°F at 40% relative humidity (RH).

Example 2

Burley tobacco (Burley 21) harvested from a greenhouse was ground in a blender without addition of water. The ground material was divided into three fractions, A, B and C which were placed in separate containers. Nitrogen was bubbled through fraction A and oxygen was bubbled through fraction B. Fraction C was simply exposed to ambient conditions in an air-conditioned room. After 72 hours each fraction was spread in sheet form as in Example 1. Fraction A was tan colored with blackish overtones; fraction B was reddish tan and more nearly the color of burley tobacco than fractions A or C; and fraction C was a little darker than fraction B.

Example 3

Burley tobacco (Burley 21) harvested from a greenhouse was ground in a blender without addition of water. The homogenized material was divided into 4 fractions which were incubated for the following periods of time: 24, 48, 72, and 168 hours respectively. The fractions were then spread in sheet form and dried. The best results were obtained with a 24 hour incubation period.

Example 4

Burley tobacco (Burley 21) harvested from a greenhouse was ground in a blender without addition of water. Fractions were incubated 24 hours at 30°, 40°, and 50° C, respectively. The best results were obtained at an incubation temperature of 30° C.

Example 5

Burley tobacco (Burley 21) harvested from a greenhouse was ground in a blender without addition of water. Fractions were incubated under combinations of the following variables: temperatures of 25°, 60°, 70° and 80° C; incubation periods of 4 to 6 hours; with and without $O_2$ bubbled through fraction; and with and without stirring. The best results were obtained at 25° C with $O_2$ bubbling. Neither stirring nor increase in time of incubation had any effect on the results.

Example 6

Burley tobacco (Ky. 14) harvested from the field was passed through a meat grinder and then ground in a blender. The homogenized material was divided into two sets of samples. 100 ml of water was added to each 200 gm of ground tobacco in the first set of samples. 100 ml of 20 percent aqueous ethanol containing 0.03 M sodium metabisulfite was added to each 200 gm of ground tobacco in the second set of samples. Samples from each set were incubated for 0, 12, 24 and 36 hours at 30°, 40° and 50° C, after which they were spread on a glass plate at a thickness of 0.75 mm and then dried either in a forced draft oven (55° C) or at room temperature. No difference in consistency was detectable between the two sets of samples. Best results were obtained with an incubation period of 24 hours at 40° C. The homogenate to which the 20 percent aqueous ethanol containing sodium metabisulfite had been added was much lighter in color than that to which water had been added.

Example 7

Burley tobacco (Ky. 14) harvested from the field was ground, and 100 ml of water was added to each of a number of 200 gm samples of the homogenate. $K_3PO_4$ was added to some of the samples to adjust the pH from 5.4 to 5.8, 6.6 and 7.4, and the samples were incubated 24 hours at 40° C, after which they were cast in sheet form and dried at room temperature. Best results were obtained at a pH level of 6.6.

Example 8

Two varieties of flue-type tobacco, pale yellow and N.C. 2326, were harvested from the field and each variety was divided into three groups. The first group was homogenized when the leaf was in a mature stage green color. The second group was piled on the floor and covered with a plastic sheet for 12 hours to yellow the leaves. The third group was sprayed with an ethylene-releasing agent and piled on the floor and covered with plastic for 12 hours to yellow. Before homogenizing each group was divided into two samples; one sample of each group was homogenized after addition of 10 ml of water to 100 gm tobacco, and the second sample after addition of 10 ml of 10 percent aqueous ethanol. The homogenates were incubated at 5° and at 25° C for 24 hours with and without stirring and were then spread in sheet form and air dried at room temperature. Treatment of the pale yellow variety sample with 10 percent ethanol prior to homogenizing and incubating at 25° C for 24 hours with stirring provided the best results. When sprayed with ethylene-releasing agents after harvesting, the leaves developed brown spots.

Example 9

Flue-type tobacco (pale yellow) was harvested in the field. One 200 gm sample was homogenized with 100 ml of 10 percent ethanol containing 0.01 M sodium metabisulfite. A second 200 gm sample was homogenized with 100 ml of 10 percent ethanol containing 0.01 M ascorbic acid. The homogenates were incubated with stirring for 24 hours. The sample containing the metabisulfite was yellow in color and had a good aroma while the one containing ascorbic acid was light brown in color, indicating that the ascorbic acid was not as good a reducing agent as the metabisulfite in respect to the color of the product. Compositional differences between the two treatments are shown in the following table:

|  | % Total Alkaloid | Sugar mg/g | Phenol mg/g | Amino Acid mg/g | Protein mg/g |
|---|---|---|---|---|---|
| Ascorbic Acid | 2.49 | 27.0 | 22.80 | 85.0 | 2.97 |
| Na Metabisulfite | 3.02 | 34.5 | 23.26 | 180.0 | 8.75 |

Example 10

Flue-type tobacco (pale yellow) was harvested as naturally ripened yellow leaves. Three 200 gm batches of tobacco were homogenized with 100 ml of fluid in separate batches. One batch contained 0.002 M metabisulfite; the other two contained 7 percent aqueous ethanol. All samples were incubated 24 hours prior to spreading into sheets, then air dried for 48 hours at room temperature (25°C). One of the samples containing ethanol was stirred continuously during incubation; the other samples were not stirred. Final rapid drying was carried out with hood exhaust fans. The sample which contained ethanol and had been stirred produced the best results in color and aroma.

Example 11

Flue-type tobacco (N.C. 2326) was harvested and the leaves were pile-yellowed indoors under plastic cover. The leaves were homogenized with water or 7 percent EtOH with or without 0.01 M metabisulfite (final concentration). Eight batches of leaves were homogenized and incubated for 18 hours under the following conditions:
1. With water, stirred.
2. With water, not stirred.
3. 0.01 M aqueous sodium metabisulfite, stirred.
4. 0.01 M aqueous sodium metabisulfite, not stirred.
5. 7.0 percent aqueous ethanol, stirred.

6. 7.0 percent aqueous ethanol, not stirred. stirred.
7. 7.0 percent aqueous ethanol containing 0.01 M sodium metabisulfite, stirred.
8. 7.0 percent aqueous ethanol containing 0.01 M sodium metabisulfite, not stirred.

The best color and aroma were obtained with condition number 7.

Example 12

Flue-type tobacco (pale yellow) was harvested slightly green. The leaves were stored in a cold room (5°C) for one week before using, then one 200 gm batch of leaf material was combined with 100 ml of water and a second 200 gm batch with 7.0 percent aqueous ethanol, both solutions containing 0.01 M sodium metabisulfite. The leaves were then homogenized. The batch processed in 7.0 percent ethanol had the best color and aroma.

Chemical analysis of the products is shown in the following table:

|  | % Total Alkaloid | Sugar mg/g | Phenol mg/g | Amino Acid mg/g | Protein mg/g |
|---|---|---|---|---|---|
| With water | 2.58 | 45.5 | 22.08 | 105.0 | 5.00 |
| With ethanol | 2.88 | 62.5 | 30.27 | 285.0 | 6.56 |

Example 13

Flue-type tobacco (NC 95), grown in a greenhouse and yellowed with an ethylene-releasing agent, was treated with added enzymes. 100 g of leaf tissue was combined with 200 ml of water containing 0.01 M metabisulfite and homogenized. The homogenate was divided into four samples: (a) control, (b) with 0.5 percent amylase (diastase of malt), (c) with 0.5 percent pectinase, and (d) with 0.5 percent protease (bromelain). Each sample was stirred vigorously for 20 minutes at beginning of incubation period, stirred for 20 minutes again 6 hours later and then for 20 minutes again after 18 hours. After 24 hours of incubation time, each sample was spread out to dry in the dark under the influence of a moving air current supplied by a hood fan. The control and the amylase and protease treated dried samples were similar in color, aroma, and texture. The pectinase treated sheet was lighter in color, more compact in texture, and had less pronounced odor than the other samples.

Chemical analysis of the products is shown in the following table:

|  | % Total Alkaloid | Sugar (mg/g sucrose) | Phenol (mg/g tyrosine) | Amino Acid (mg/g glycine) | Protein (mg/g BSA) | Moisture retention (% at 25°C) |
|---|---|---|---|---|---|---|
| Control | 1.02 | 56.25 | 43.42 | 78.0 | 15.0 | 5.0 |
| Amylase | 0.77 | 53.75 | 32.90 | 19.2 | 10.6 | 5.6 |
| Pectinase | 0.88 | 86.25 | 32.94 | 37.2 | 7.6 | 5.0 |
| Protease | 0.88 | 43.75 | 34.62 | 43.2 | 8.6 | 6.6 |

These results indicate that the chemical composition of tobacco material can be modified by addition of enzymes to the homogenate during the incubation stage.

Example 14

Burely type tobacco (Burley 21) was harvested when matured. One sample was subjected to conventional air curing, another to homogenized curing. The results indicated that the homogenized method may eliminate 80 percent of the manual labor or 50 percent of total farm labor required with conventional air curing.

Example 15

Burley type tobacco was harvested at maturity and subjected to conventional air curing and to homogenized curing. The homogenized cured tobacco was lower in nicotine, nitrate nitrogen, ammonia nitrogen, total nitrogen, potassium and calcium and higher in sugar. There was no significant difference in phenols and phosphorus. Chemical analysis of the cured products is shown in the following table:

|  | Bottom Leaf | | Middle Leaf | | Whole Plant | |
|---|---|---|---|---|---|---|
|  | HLC[1] | CC[2] | HLC | CC | HLC | CC |
| Nicotine, % | 2.10 | 2.73 | 1.88 | 3.39 | 3.00 | 3.38 |
| Nitrate N, % | 0.85 | 1.02 | 0.65 | 0.98 | 0.70 | 0.90 |
| Ammonia N, % | 0.02 | 0.11 | 0.01 | 0.16 | 0.02 | 0.23 |
| Total N, % | 3.65 | 4.08 | 4.15 | 4.52 | 4.35 | 4.40 |
| Sugar, % | 2.08 | 1.12 | 1.28 | 1.18 | 1.50 | 1.18 |
| Phenols, % | 0.60 | 0.57 | 0.58 | 0.73 | 0.66 | 0.76 |
| Potassium | 5.40 | 6.15 | 5.12 | 5.92 | 5.02 | 5.60 |
| Calcium, % | 4.38 | 5.00 | 3.45 | 4.52 | 3.38 | 4.28 |
| Phosphorus, % | 0.17 | 0.18 | 0.20 | 0.19 | 0.22 | 0.22 |

[1]HLC — Homogenized leaf curing.
[2]CC — Conventional curing.

Example 16

Mature Burely tobacco leaf was harvested from a greenhouse and rinsed with petroleum ether before homogenization. The petroleum ether washings were combined and evaporated to dryness. The residue was discarded, the petroleum ether evaporate was collected and returned to the homogenate. After 24 hours incubation the homogenate was spread in sheet form and air dried. The dried "cured" sheet showed satisfactory color and aroma.

Example 17

Mature Burley type tobacco was harvested from a greenhouse and homogenized. Petroleum ether was added to the homogenate to extract petroleum ether soluble components. The petroleum ether fraction was distilled and the distillate was returned to the homogenate. The residue was discarded. The homogenate was allowed to stand for 24 hours after which it was spread in sheet form and air dried. The cured tobacco showed satisfactory color and aroma.

Example 18

Leaves were harvested from the lower half of flue type tobacco plants and pile yellowed under plastic sheets at about 25°C. until they were about three quarters yellow. Usually, this pile yellowing process took 2 to 3 days. The leaves on the upper half of the plants were yellowed in the field by spraying each plant with about 20 ml. of an aqueous solution of an ethylene releasing agent, 2-chloroethylphosphonic acid (Ethrel). The concentration of the ethrel solution was such that about 120 mg of the ethylene releasing agent was deposited on each plant; that is, about 6 mg/ml. The upper leaves were harvested about 3 to 4 days after being sprayed. The tobacco leaves were then homogenized, incubated and dried. During homogenization, dry sodium metabisulfite was slowly added at a rate of 0.95 g/454 g leaf tissue to give a 0.02 M final concentration to prevent formation of brown pigments. The homogenized material was incubated and dried in a 2.5 cu. ft. mixer lined with Teflon (tetrafluoroethylene fluorocarbon resins) while directing a hot air blast from 300°–500°F heat gun into the mouth of the mixing drum. Additional heat for drying was supplied by means of a 250 watt infrared bulb mounted on a common stand with the heat gun.

The homogenized leaf slurry was incubated in batches of 25 to 50 pounds with the mixer rotating at a rate of 25 r.p.m. The combined heat gun and infrared lamp heated the slurry mass to about 45°C. For a 25 lb batch, it required 8 hours to remove 50 percent of the moisture. When this state is reached the incubation usually ceases because there is not enough moisture present to effect any chemical changes, in the homogenized tobacco. However, as the moisture level decreases, the rate of dehydration accelerates so that at the end of 12 hours the moisture content is lowered to 4.0 to 5.0 percent which is the final moisture content of the homogenized, cured material.

The above described method of continuous agitated incubation and drying was found to be far superior to known methods because it prevented excessive loss of sugars. In conventional static incubation and drying, 90 percent of the reducing sugars are lost by oxidation, while in the accelerated method of this invention 50 to 100 percent of the sugars ordinarily found in barn cured controls were retained. The higher amounts of sugar retention were usually found in the ethrel treated field ripened upper leaf material. In addition to the higher sugar content, other advantages of the process of this invention are that it prevented loss of those substances that contribute to the aroma of tobacco and it produced a product having a light yellow color.

Example 19

Harvested mature flue type tobacco was homogenized and incubated in the same equipment and under the same condition as in Example 18. Sodium metabisulfite was added at the same rate to give the same final concentration as in Example 18. After tumbling for about an hour or less in the mixer, the leaf slurry was dried at about 85°C in a vacuum oven evacuated to 25 inches Hg. for about 18 hours. This process is even more advantageous than that of Example 18 because the product has a more pleasant aroma and is even lighter in color than that obtained in Example 18.

The above results indicate that although accelerated drying is necessary to prevent loss of sugars, drying under reduced pressure results in further improvements. The reason for the improvement may be that vacuum drying prevents enzymatic oxidation of phenolic substances by lowering the oxygen tension and thereby retarding conversion of phenolic derived quinones to brown pigments.

Alternatively, the incubated material can be freeze-dried.

In this process of vacuum or freeze drying, the incubation period for flue-cured tobacco may vary from 1 to 2 hours and that of air cured tobacco from 10 to 24 hours depending on the maturity of the harvested leaf.

The use of metabisulfite is a common practice in the wine industry. It has antioxidant properties and as an antiseptic it prevents unwanted fermentation. (The Technology of Wine Making, 2nd Edition, The AVI Publishing Company, Inc., Westport, Connecticut, 1967, M. A. Amerine, H. W. Berg and W. V. Cruess, page 257). The same reference, on page 751, shows that the limit of $SO_2$ allowed in wines is 350 p.p.m. Metabisulfite is used in the process of this invention to control the browning reaction so that the product will not be dark colored. Metabisulfite is inhibitory to the polyphenoloxidase activity which causes browning of the homogenized material when the enzyme and substrate come into contact. It has also been suggested that sulfur compounds may be advantageous with respect to the smoking and health issues (J. Chromat. 57, 239-246, 1971). According to this view, sulfur compounds could protect against alkylating agents during the pyrolysis of tobacco.

A comparison was made of the $SO_2$ content in tobacco material cured by the homogenized method with that of conventional barn cured tobacco (variety Coker 319). The following table shows that only in two out of six cases was there a notable increase in $SO_2$ levels in the leaf, but in no case did the level exceed the tolerance limit of 350 p.p.m. established for wine.

| Priming | Planting | $SO_2$ (p.p.m.) Homogenized cured | Conventional Barn cured |
|---|---|---|---|
| 1st (lower leaves) | 1 | 160 | 112 |
|  | 2 | 160 | 144 |
| 2nd (middle leaves) | 1 | 96 | 96 |
|  | 2 | 272 | 128 |
| 3rd (upper leaves) | 1 | 144 | 144 |
|  | 2 | 224 | 112 |

Although the examples are limited to a few readily available types of tobacco, the process is applicable to many other types. As noted in the examples, homogenization can be used to modify the chemical composition of cured tobacco. Further modification can be accomplished by the use of other techniques during homogenization and incubation such as variable temperatures, enzyme and microbial action, chemical binding, hydrolysis, removal of undesirable components and addition of desirable components, and aging or fermenting under various conditions. In fact, it is not difficult to visualize the production of tailor-made tobacco products by the homogenizedcuring process of this invention.

We claim:
1. A process for curing tobacco comprising the steps of:
   a. providing uncured tobacco leaves;
   b. homogenizing the leaves in the presence of a 7.0 percent aqueous ethanol solution;
   c. incubating the homogenized leaves for up to about 168 hours at a temperature of from 25°C. to 80°C; and
   d. drying the incubated homogenate.

2. The process of claim 1 wherein the homogenized leaves are incubated for from 18 to 24 hours and are continuously stirred during the incubation period.

3. The process of claim 1 wherein the 7.0 percent aqueous ethanol solution contains 0.01M sodium metabisulfite and the homogenized leaves are incubated for up to 18 hours.

4. A process for curing naturally and artificially yellowed leaf tobacco, comprising the steps of:
 a. homogenizing the leaves;
 b. adding, during step (a), dry sodium metabisulfite at a rate of 0.95 gm. per 454 gms. of leaf tissue to give a final concentration in the homogenate of about 0.02M metabisulfite;
 c. incubating for up to one hour at about 45°C. while continuously tumbling the leaf mass; and
 d. drying the incubated homogenate.

5. The process of claim 4 wherein the incubated homogenate is dried by a method selected from the group consisting of direct application of heat, freeze drying and drying under reduced pressure.

6. A cured tobacco product obtained by the process comprising:
 a. providing uncured tobacco leaves;
 b. homogenizing the leaves in the presence of a 7.0 percent aqueous ethanol solution containing 0.01M sodium metabisulfite;
 c. incubating the homogenized leaves for about 18 hours; and
 d. drying the incubated homogenate.

7. A cured tobacco product obtained by the process comprising:
 a. providing naturally and artificially yellowed leaf tobacco;
 b. homogenizing the leaves;
 c. adding, during step (b), dry sodium metabisulfite at a rate of 0.95 gms. per 454 gms. of leaf tissue to give a final concentration in the homogenate of about 0.02M metabisulfite;
 d. incubating for up to one hour at about 45°C. while continuously tumbling the leaf mass; and
 e. drying the incubated homogenate.

* * * * *

UNITED STATES PATENT OFFICE
CERTIFICATE OF CORRECTION

PATENT NO. : 3,845,774
DATED : November 5, 1974
INVENTOR(S) : Tien C. Tso, Richie H. Lowe and Donald W. DeJong It is certified that error appears in the above-identified patent and that said Letters Patent are hereby corrected as shown below:

The following statement should appear in the heading in Col. 1:

Assignee: The United States of America, as represented by the Secretary of Agriculture.

Signed and Sealed this twenty-second Day of June 1976

[SEAL]

Attest:

RUTH C. MASON
*Attesting Officer*

C. MARSHALL DANN
*Commissioner of Patents and Trademarks*